(12) United States Patent
Labarge et al.

(10) Patent No.: US 6,624,113 B2
(45) Date of Patent: Sep. 23, 2003

(54) ALKALI METAL/ALKALINE EARTH LEAN $NO_X$ CATALYST

(75) Inventors: William J. Labarge, Bay City, MI (US); Mark Hemingway, Columbiaville, MI (US); Joachim Kupe, Davisburg, MI (US); Galen B. Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 116 days.

(21) Appl. No.: 09/805,677

(22) Filed: Mar. 13, 2001

(65) Prior Publication Data

US 2002/0132727 A1 Sep. 19, 2002

(51) Int. Cl.⁷ .................................................. B01J 23/02
(52) U.S. Cl. ........................... 502/344; 502/64; 502/67
(58) Field of Search ................................ 502/340, 344, 502/341, 64, 67, 71, 77, 79; 423/213.2, 239.1, 239.2

(56) References Cited

U.S. PATENT DOCUMENTS

| | | | |
|---|---|---|---|
| 4,091,076 A | * 5/1978 | Vogel et al. ................. 252/190 |
| 4,212,771 A | 7/1980 | Hamner | |
| 4,639,259 A | 1/1987 | Pearson | |
| 4,762,537 A | 8/1988 | Fleming et al. | |
| 4,919,905 A | 4/1990 | Horaguchi et al. | |
| 4,977,124 A | * 12/1990 | Smith ........................... 502/174 |
| 5,116,586 A | 5/1992 | Baacke et al. | |
| 5,149,435 A | 9/1992 | Laube | |
| 5,153,165 A | * 10/1992 | Lowery et al. .............. 502/243 |
| 5,312,608 A | * 5/1994 | Hayasaka et al. .......... 423/213.5 |
| 5,500,198 A | * 3/1996 | Liu et al. ................... 423/437.1 |
| 5,559,073 A | * 9/1996 | Hu et al. ..................... 502/302 |
| 5,727,385 A | 3/1998 | Hepburn | |
| 5,849,254 A | * 12/1998 | Suzuki et al. ............. 423/213.5 |
| 5,879,645 A | 3/1999 | Park et al. | |
| 5,884,473 A | * 3/1999 | Noda et al. .................... 60/274 |
| 5,906,958 A | 5/1999 | Park et al. | |
| 5,948,376 A | * 9/1999 | Miyoshi et al. .......... 423/213.5 |
| 5,990,038 A | 11/1999 | Suga et al. | |
| 5,997,830 A | * 12/1999 | Itoh et al. ................. 423/213.5 |
| 6,025,297 A | * 2/2000 | Ogura et al. ................. 502/300 |
| 6,043,189 A | * 3/2000 | Narbeshuber et al. ....... 502/340 |
| 6,184,167 B1 | 2/2001 | Van Mao et al. | |

FOREIGN PATENT DOCUMENTS

| | | |
|---|---|---|
| EP | 0 852 966 A1 | 7/1998 |
| EP | 0 899 002 A2 | 3/1999 |
| EP | 1 008 378 A1 | 6/2000 |
| EP | 1 026 374 A2 | 8/2000 |
| EP | 1036591 A1 | 9/2000 |
| JP | 56002848 A | 1/1981 |
| JP | 2293050 A | 12/1990 |
| JP | 3267151 A | 11/1991 |
| JP | 4338233 A | 11/1992 |
| JP | 4367707 A | 11/1992 |
| JP | 4367707 A | 12/1992 |
| JP | 5031357 A | 2/1993 |
| JP | 5192535 A | 8/1993 |
| JP | 5277376 A | 10/1993 |
| JP | 6226052 A | 8/1994 |
| JP | 7100386 A | 4/1995 |
| JP | 7136518 A | 5/1995 |
| JP | 7328440 A | 12/1995 |
| JP | 8010573 A | 1/1996 |
| JP | 8038888 A | 2/1996 |
| JP | 8038889 A | 2/1996 |
| JP | 8155303 A | 6/1996 |
| JP | 8229355 A | 9/1996 |
| JP | 8281110 A | 10/1996 |
| JP | 9103652 A | 4/1997 |
| JP | 9155185 A | 6/1997 |
| JP | 9225264 A | 9/1997 |
| JP | 9239276 A | 9/1997 |
| JP | 9248462 A | 9/1997 |
| JP | 92534532 A | 9/1997 |
| JP | 10057811 A | 3/1998 |
| JP | 10118457 A | 5/1998 |
| JP | 10118486 A | 5/1998 |
| JP | 10128114 A | 5/1998 |
| JP | 10165819 A | 6/1998 |
| JP | 10192713 A | 7/1998 |
| JP | 10290933 A | 11/1998 |
| JP | 11057477 A | 3/1999 |
| JP | 11169670 A | 6/1999 |
| JP | 11207190 A | 8/1999 |
| JP | 11221466 A | 8/1999 |
| JP | 11226404 A | 8/1999 |

OTHER PUBLICATIONS

Grant et al., Chemical Dictionary (Oct. 23, 1990), McGraw–Hill Book Co., 5$^{th}$ edition, p. 364.*

* cited by examiner

Primary Examiner—Stanley S. Silverman
Assistant Examiner—Edward M. Johnson
(74) Attorney, Agent, or Firm—Jimmy L. Funke

(57) ABSTRACT

One embodiment of a non-precious metal catalyst for treating an exhaust gas stream comprises an alkali metal oxide component comprising lithium oxide, in combination with an alkaline earth support component, wherein the alkaline earth support component is an alkaline earth zeolite catalyst, an alkaline earth alumina catalyst, or a mixture thereof. Another embodiment of a non-precious metal catalyst for treating an exhaust gas stream comprises a substrate supporting a coating having more than about 6 weight percent of a lithium oxide component in combination with less than about 49 weight percent of an barium zeolite catalyst component and less than about 42 weight percent of a barium alumina catalyst component and not more than about 7 weight percent of a ceramic oxide binder.

21 Claims, No Drawings

ALKALI METAL/ALKALINE EARTH LEAN NO$_X$ CATALYST

BACKGROUND OF THE INVENTION

The present invention relates to a catalyst for purifying exhaust gases from an internal combustion engine. In particular, it relates to a lean NO$_x$ catalyst.

It is well known in the art to use catalyst compositions, including those commonly referred to as three-way conversion ("TWC") catalysts to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides (NO$_x$) in exhaust gas, provided that the engine is operated around balanced stoichiometry for combustion ("combustion stoichiometry"; i.e., between about 14.7 and 14.4 air/fuel (A/F) ratio).

However, fuel economy and global carbon dioxide (CO$_2$) emissions have made it desirable to operate engines under lean-burn conditions, where the air-to-fuel ratio is somewhat greater than combustion stoichiometry to realize a benefit in fuel economy. Diesel and lean-burn gasoline engines generally operate under highly oxidizing conditions (i.e., using much more air than is necessary to burn the fuel), typically at air/fuel ratios greater than 14.7 and generally between 19 and 35 Under these highly lean conditions, typical three-way catalysts exhibit little activity toward NO$_x$ reduction, as their reduction activity is suppressed by the presence of excess oxygen.

The control of NO$_x$ emissions from vehicles is a worldwide environmental problem. Lean-burn, high air-to-fuel ratio, and diesel engines are certain to become more important in meeting the mandated fuel economy requirements of next-generation vehicles. Development of an effective and durable catalyst for controlling NO$_x$ emissions under net oxidizing conditions accordingly is critical.

Recently, copper-ion exchanged zeolite catalysts have been shown to be active for selective reduction of NO$_x$ by hydrocarbons in the presence of excess oxygen. Platinum-ion exchanged zeolite catalyst is also known to be active for NO$_x$ reduction by hydrocarbons under lean conditions. However, this catalytic activity is significant only in a narrow temperature range around the lightoff temperature of hydrocarbon oxidation. All the known lean-NO$_x$ catalysts reported in the literature tend to lose their catalytic activity for NO$_x$ reduction when the catalyst temperature reaches well above the lightoff temperature of hydrocarbon oxidation. This narrow temperature window of the lean-NO$_x$ catalysts is considered to be one of the major technical obstacles, because it makes practical application of these catalysts difficult for lean-burn gasoline or diesel engines.). As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-NO$_x$ catalysts must overcome all three problems simultaneously before they can be considered for commercial use. In the case of sulfur poisoning, some gasoline can contain up to 1200 ppm of organo-sulfur compounds. Lean-NO$_x$ catalysts promote the conversion of such compounds to SO$_2$ and SO$_3$ during combustion. Such SO$_2$ will adsorb onto the precious metal sites at temperatures below 300° C. and thereby inhibits the catalytic conversions of CO, C$_x$H$_y$ (hydrocarbons) and NO$_x$. At higher temperatures with an Al$_2$O$_3$ catalyst carrier, SO$_2$ is converted to SO$_3$ to form a large-volume, low-density material, Al$_2$(SO$_4$)$_3$, that alters the catalyst surface area and leads to deactivation. In the prior art, the primary solution to this problem has been to use fuels with low sulfur contents.

Another alternative is to use catalysts that selectively reduce NO$_x$ in the presence of a co-reductant, e.g., selective catalytic reduction (SCR) using ammonia or urea as a co-reductant. Selective catalytic reduction is based on the reaction of NO with hydrocarbon species activated on the catalyst surface and the subsequent reduction of NO$_x$ to N$_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-NO$_x$ catalysts are too susceptible to high temperatures, water vapor and sulfur poisoning (from SO$_x$).

Yet another viable alternative involves using co-existing hydrocarbons in the exhaust of mobile lean-burn gasoline engines as a co-reductant and is a more practical, cost-effective, and environmentally sound approach. The search for effective and durable non-selective catalytic reduction "NSCR" catalysts that work with hydrocarbon co-reductant in oxygen-rich environments is a high-priority issue in emissions control and the subject of intense investigations by automobile and catalyst companies, and universities, throughout the world.

A leading catalytic technology for removal of NO$_x$ from lean-burn engine exhausts involves NO$_x$ storage reduction catalysis, commonly called the "lean-NO$_x$ trap". The lean-NO$_x$ trap technology can involve the catalytic oxidation of NO to NO$_2$ by catalytic metal components effective for such oxidation, such as precious metals. However, in the lean NO$_x$ trap, the formation of NO$_2$ is followed by the formation of a nitrate when the NO$_2$ is adsorbed onto the catalyst surface. The NO$_2$ is thus "trapped", i.e., stored, on the catalyst surface in the nitrate form and subsequently decomposed by periodically operating the system under stoichiometrically fuel-rich combustion conditions that effect a reduction of the released NO$_x$ (nitrate) to N$_2$.

The lean-NO$_x$-trap technology has been limited to use for low sulfur fuels because catalysts that are active for converting NO to NO$_2$ are also active in converting SO$_2$ to SO$_3$. Lean NO$_x$ trap catalysts have shown serious deactivation in the presence of SO$_x$ because, under oxygen-rich conditions, SO$_x$ adsorbs more strongly on NO$_2$ adsorption sites than NO$_2$, and the adsorbed SO$_x$ does not desorb altogether even under fuel-rich conditions. Such presence of SO$_3$ leads to the formation of sulfuric acid and sulfates that increase the particulates in the exhaust and poison the active sites on the catalyst. Attempts with limited success to solve such a problem have encompassed the use of selective SO$_x$ adsorbents upstream of lean NO$_x$ trap adsorbents. Furthermore, catalytic oxidation of NO to NO$_2$ is limited in its temperature range. Oxidation of NO to NO$_2$ by a conventional Pt-based catalyst maximizes at about 250° C. and loses its efficiency below about 100 degrees and above about 400 degrees. Thus, the search continues in the development of systems that improve lean NO$_x$ trap technology with respect to temperature and sulfur considerations.

Another $NO_x$ removal technique comprises a non-thermal plasma gas treatment of NO to produce $NO_2$ which is then combined with catalytic storage reduction treatment, e.g., a lean $NO_x$ trap, to enhance $NO_x$ reduction in oxygen-rich vehicle engine exhausts. In the lean $NO_x$ trap, the $NO_2$ from the plasma treatment is adsorbed on a nitrate-forming material, such as an alkali material, and stored as a nitrate. An engine controller periodically runs a brief fuel-rich condition to provide hydrocarbons for a reaction that decomposes the stored nitrate into benign products such as $N_2$. By using a plasma, the lean $NO_x$ trap catalyst can be implemented with known $NO_x$ absorbers, and the catalyst may contain less or essentially no precious metals, such as Pt, Pd and Rh, for reduction of the nitrate to $N_2$. Accordingly, an advantage is that a method for $NO_x$ emission reduction is provided that is inexpensive and reliable. The plasma-assisted lean $NO_x$ trap can allow the life of precious metal lean $NO_x$ trap catalysts to be extended for relatively inexpensive compliance to $NO_x$ emission reduction laws. Furthermore, not only does the plasma-assisted lean $NO_x$ trap process improve the activity, durability, and temperature window of lean $NO_x$ trap catalysts, but it allows the combustion of fuels containing relatively high sulfur contents with a concomitant reduction of $NO_x$, particularly in an oxygen-rich vehicular environment.

What is needed in the art is an exhaust gas catalyst system having improved durability, as well as effective $NO_x$ management, over extended operating time. The present invention overcomes many of the shortcomings of the prior art.

SUMMARY OF THE INVENTION

Alkali metal oxides, such as lithium oxide, generally are not very good catalysts for $NO_x$ treatment, and, additionally, are very susceptible to sulfate poisoning. Alkaline earth oxides, such as barium oxide, generally are good $NO_x$ catalysts, but, they also are susceptible to sulfate poisoning. However, alkali metal sulfates generally have a low temperature of decomposition. In particular, lithium sulfate, of all the alkali or alkaline earth sulfates, has the lowest temperature of decomposition. Lithium sulfate formed on a catalyst bed decomposes at ~800° C. in an oxidizing atmosphere. In contrast, barium sulfate, of all the alkali or alkaline earth sulfates, has the highest temperature of decomposition, at about 1600° C. in an oxidizing atmosphere.

Some lean burn applications, such as diesel engines, are never "rich". An always lean system cannot generate an exotherm from hydrocarbon combustion and seldom exceeds about 800° C. on a catalyst bed. Alkaline earth sulfates, and even most alkali metal sulfates, accordingly would not typically be expected to ever decompose once formed on an always lean system. Nevertheless, lithium sulfates may decompose even at the temperatures achievable on an always lean system.

According to the present invention, an alkali metal oxide is included into the catalyst formulation of a $NO_x$ occluding catalyst. The alkali metal oxide provides a preferential scavenger for sulfates deposited on the catalyst surface. The alkali metal sulfate can be decomposed during high temperature excursions. The alkali metal sulfate sulfate decomposes to lithium oxide and sulfur is released to the exhaust stream as $SO_2$. In this manner, irreversible sulfation of the active $NO_x$ agent and ozone agent is thereby prevented.

The above-described and other features and advantages of the present invention will be appreciated and understood by those skilled in the art from the following detailed description, and appended claims.

DESCRIPTION OF PREFERRED EMBODIMENTS

The catalyst generally comprises a calcined coating of an alkali metal oxide and an alkaline earth/support oxide coated onto a chemically stable and thermally insulating substrate, typically such as cordierite, mullite, and the like. The support oxide generally may be a zeolite or an aluminum oxide or a mixture of zeolite and aluminum oxide. Preferably, the catalyst coating also includes a ceramic oxide binder and/or stabilizer.

The alkali metal oxide catalyst component may comprise any alkali metal. Preferably, the alkali metal oxide catalyst component comprises an alkali metal selected from the group consisting of potassium, sodium, lithium, and mixtures thereof. Sodium and lithium and mixtures thereof are more preferred; lithium is particularly preferred.

Suitable lithium compounds for introduction of the alkali metal component include lithium formate, lithium citrate, lithium acetate, lithium oxylate, lithium nitrate, lithium carbonate, lithium hydroxide and lithium oxide. Lithium acetate, lithium oxylate, and lithium formate are preferred. Lithium formate is particularly preferred.

Suitable sodium compounds for introduction of the alkali metal component include sodium formate, sodium citrate, sodium acetate, sodium oxylate, sodium nitrate, sodium carbonate, sodium hydroxide and sodium oxide. Sodium acetate, sodium oxylate, and sodium formate are preferred. Sodium formate is particularly preferred.

Suitable potassium compounds for introduction of the alkali metal component include potassium formate, potassium citrate, potassium acetate, potassium oxylate, potassium nitrate, potassium carbonate, potassium hydroxide and potassium oxide. Potassium acetate, potassium oxylate, and potassium formate are preferred. Potassium formate is particularly preferred.

The alkaline earth/support catalyst component preferably is not more than about 95 wt % of the total catalyst, and more preferred at not more than about 90 wt %. Particularly preferred is alkaline earth/support component at about 85 wt %. Preferably, the alkali metal oxide catalyst component is at least about 4 wt % and more preferred at least about 8 wt %. Particularly preferred is alkali metal oxide at about 12 wt %. The ceramic binder preferably is greater than about 1 wt % and not more than about 7 wt %; about 3 wt % is particularly preferred.

A preferred calcined catalyst coating comprises less than about 49 wt % alkaline earth/zeolite, less than about 42 wt % alkaline earth/aluminum oxide, more than about 6 wt % alkali metal oxide and not more than about 7 wt % ceramic oxide binder. A more preferred calcined coating comprises less than about 48 wt % alkaline earth/zeolite, less than about 41 wt % alkaline earth/aluminum oxide, more than about 8 wt % alkali metal oxide, and not more than about 5 wt % ceramic oxide binder. A particularly preferred calcined coating comprises about 47 wt % alkaline earth/zeolite, about 40 wt % alkaline earth/aluminum oxide, about 10 wt % alkali metal oxide and about 3 wt % ceramic oxide binder.

The surface area of the alkali metal oxides may be stabilized with other binder oxides, such as oxides of silicon, titanium, and/or zirconium. Titanium and zirconium are preferred; zirconium is particularly preferred. The binder/stabilizer preferably comprises not more than about 7 wt %; more preferred at not more than about 5 wt %; and, particularly preferred not more than about 3 wt %.

Suitable zirconium compounds for introduction of the surface area stabilizer include zirconium acetylacetonate, zirconium n-butoxide, zirconium nitrate, zirconium tetraamine nitrate, zirconium tetraamine citrate, zirconium 2-ethylhexanoate, and zirconium isopropoxide. Zirconium tetraamine citrate, zirconium butoxide, and zirconium isopropoxide are preferred; zirconium butoxide and zirconium isopropoxide are more preferred; and, zirconium isopropoxide is particularly preferred.

Suitable titanium compounds for introduction of the surface area stabilizer include titanium oxylate, titanium ethoxide, titanium methoxide, titanium isopropoxide, zirconium n-butoxide. Titanium butoxide, titanium ethoxide, and titanium isopropoxide are preferred; titanium ethoxide and titanium isopropoxide are more preferred; and, titanium isopropoxide is particularly preferred.

Suitable silicon compounds for introduction of the surface area stabilizer include silicon acetate, tetraethoxysilane, tetramethoxysilane, vinyltrimethoxysilane, ureidopropyltriethoxysilane and aminopropylsilanetriol. Tetraethoxysilane, silicon acetate, and tetramethoxysilane are preferred; silicon acetate and tetramethoxysilane are more preferred; and, tetramethoxysilane is particularly preferred.

The catalyst of the present invention comprises an alkaline earth/support component, wherein the support may be a zeolite and/or alumina. The alumina fraction of the support may be present in a proportion ranging from about 0 wt % to about 100 wt % of the alkaline earth/support fraction. A particularly preferred admixture comprises an alkaline earth/aluminum oxide fraction in a proportion ranging from about 35 wt % to about 45 wt %, and an alkaline earth/zeolite fraction in a proportion ranging from about 55 wt % to about 65 wt %.

Any type zeolite may be used; preferred zeolites include X type zeolite, Y type zeolite, and/or ZSM-5 type zeolite. A ZSM-5 zeolite with pores 4–5 A (angstroms) is preferred and an X zeolite is more preferred and a Y-type zeolite with pores 7–8 A is greatly preferred. A zeolite surface area of at least about 300 $m^2$/gram is preferred, at least about 400 $m^2$/g is more preferred, and a surface area of at least about 500 $m^2$/g is particularly preferred. The preferred zeolite average particle size is less than about 0.9 microns; more preferred are zeolite particles of an average size less than about 0.6 microns; and particularly preferred are zeolites having an average particle size less than about 0.3 microns. The zeolite particles preferably feature average pore sizes ranging from about 4 to about 10 angstroms ("A"), with average pore sizes ranging from about 7 to 8 A particularly preferred. Preferably, the zeolite has a $Na_2O$ content of at least about 3 wt %; a content of at least about 8 wt % is more preferred; and a content of at least about 13 wt % is particularly preferred.

The aluminum oxide particles providing the matrix comprise agglomerations of small psuedocrystalline alumina particles typically of about 0.3 microns or less. The agglomerations preferably are larger than about 10 microns and less than about 30 microns. The alumina matrix is mixed with a Ba-zeolite catalyst component, typically featuring a particulate size of about 0.3 microns. In general, the smaller the zeolite particle, the more hydrothermally stable the zeolite becomes, thereby improving its long-term activity. Pursuant to the invention, the zeolite active catalysts preferably are dispersed throughout the alumina matrix.

Preferably, the alumina has a surface area of at least about 150 $m^2$/gram; a surface area of at least about 200 $m^2$/g is more preferred; and, a surface area of at least about 250 $m^2$/g is particularly preferred. An average alumina pore size of at least about 40 A is preferred; a pore size of at least about 60 A is more preferred; and, a pore size of at least about 80 A is particularly preferred. Specific acidity ranging from about 50 moles (millimoles) n-butylamine/$m^2 \times 10^{-4}$ to about 500 mmoles n-butylamine/$m^2 \times 10^{-4}$ is preferred; a specific acidity of about 350 mmoles n-butlyamine/$m^2 \times 10^{-4}$ is particularly preferred.

The zeolite catalyst component preferably comprises an alkaline earth content of about 18 wt % to about 36 wt %; about 24 wt % to about 30 wt % is particularly preferred. The aluminum oxide catalyst component preferably comprises an alkaline earth content of about 18 wt % to about 36 wt %; about 24 wt % to about 30 wt % is particularly preferred.

Any alkaline earth element may be used as the active catalyst. For example, the active catalyst element may comprise calcium, strontium, and/or barium. The use of barium is particularly preferred. Tests have indicated that calcium-doped catalysts generally convert about 30% $NO_x$ to $N_2$; strontium-doped catalysts generally convert about 50% $NO_x$ to $N_2$; barium-doped catalysts generally convert about 70% $NO_x$ to $N_2$. Based on a desire in the industry to optimize conversion of $NO_x$ to $N_2$ at about 90% or better, barium is the particularly preferred occluding catalyst material.

Accordingly, Ba is the preferred occluding catalyst for both the zeolite and the alumina components of the present catalyst. The alumina matrix features enhanced trapping efficiency if it is doped with a material such as barium. In specific, nitrogen species can neutralize catalytically active sites. Barium is the most robust alkaline earth element for resistance to nitrogen poisoning. The alumina matrix provides sacrificial sites for nitrogen poisoning, thus precluding large polycyclic nitrogen compounds from entering and poisoning the small pores of the zeolite catalyst component. The zeolite catalyst component preferably comprises a barium content of about 18 wt % to about 3,6 wt %; about 24 wt % to about 30 wt % is particularly preferred. The alumina matrix catalyst component preferably has a barium content of at least about 14 wt %; at least about 21 wt % is more preferred; and, at least about 28 wt % is particularly preferred. Exhaust deposits of oil derived "glassy" compounds such as calcium phosphate and zinc phosphate can greatly reduce diffusion. High levels of alkaline earths, such as barium, prevent formation of these diffusion limiting barriers.

Suitable barium sources for preparation of a barium-alumina component include barium nitrate, barium acetate, barium hydroxide, barium ethoxide, barium isopropoxide, and/or barium 2-ethylhexanoate. Barium acetate, barium isopropoxide, and barium 2-ethylhexanoate are preferred. Barium 2-ethylhexanoate is particularly preferred.

The following examples are provided to further describe the invention. The examples are intended to be illustrative in nature and are not to be construed as limiting the scope of the invention.

EXAMPLE I

Preparation of a Ba-Zeolite Component.

About 1000 grams Y-Zeolite with a $Na_2O$ content of 13 wt % is mixed with a saturated barium-nitrate solution and heated to 80° C. for 4 hours. The solids are filtered then washed then calcined at 740° C. for 2 hours.

Preparation of Catalyst Monolith

About 1000 grams Ba-Zeolite, 285 grams lithium formate, 72 grams lithium oxide and 1150 grams water are well mixed. Ceramic monoliths containing 600 cells/in3 are washcoated with the mixture then calcined at 500° C. for 4 hours.

EXAMPLE II

Preparation of a Ba-Aluminum Oxide Component.

About 1000 grams gamma aluminum oxide with a surface area of at least 150 m$^2$/gram with is mixed with a saturated barium-formate solution and heated to 80° C. for 4 hours. The solids are filtered then washed then calcined at 500° C. for 2 hours.

Preparation of Catalyst Monolith

About 1000 grams Ba-aluminum oxide, 285 grams lithium formate, 72 grams lithium oxide and 1150 grams water are well mixed. Ceramic monoliths containing 600 cells/in$^3$ are washcoated with the mixture then calcined at 500° C. for 4 hours.

EXAMPLE III

Preparation of a Ba-Zeolite Component.

About 1000 grams Y-Zeolite with a Na2O content of 13 wt % is mixed with a saturated barium-nitrate solution and heated to 80° C. for 4 hours. The solids are filtered then washed then calcined at 740° C. for 2 hours.

Preparation of a Ba-Aluminum Oxide Component.

About 1000 grams gamma aluminum oxide with a surface area of at least 150 m$^2$/gram with is mixed with a saturated barium-formate solution and heated to 80° C. for 4 hours. The solids are filtered then washed then calcined at 500° C. for 2 hours.

Preparation of Catalyst Monolith

About 285 grams lithium formate, 72 grams lithium oxide, 420 grams Ba-Zeolite, 280 grams Ba-aluminum oxide and 1150 grams water are well mixed. Ceramic monoliths containing 600 cells/in$^3$ are washcoated with the mixture then calcined at 500° C. for 4 hours.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A non-precious metal catalyst for treating an exhaust gas stream comprising an alkali metal oxide component comprising lithium oxide, in combination with an alkaline earth support component, wherein the alkaline earth support component comprises an alkaline earth zeolite catalyst, and wherein no precious metals are present in the catalyst.

2. The catalyst of claim 1 comprising at least about 4 weight percent of an alkali metal oxide component in combination with not more than about 95 weight percent of an alkaline earth support component.

3. The catalyst of claim 2 comprising at least about 8 weight percent of an alkali metal oxide component in combination with not more than about 90 weight percent of an alkaline earth support component.

4. The catalyst of claim 3 comprising about 12 weight percent of an alkali metal oxide component in combination with about 85 weight percent of an alkaline earth support component.

5. The catalyst of claim 1 for treating an exhaust gas stream comprising an alkali metal oxide component wherein the alkali metal is selected from the group consisting of potassium, sodium, lithium, and mixtures thereof.

6. The catalyst of claim 5 for treating an exhaust gas stream comprising an alkali metal oxide component wherein the alkali metal is lithium.

7. The catalyst of claim 1 for treating an exhaust gas stream comprising an alkaline earth support component wherein the alkaline earth is selected from the group consisting of barium, strontium, calcium, and mixtures thereof.

8. The catalyst of claim 7 for treating an exhaust gas stream comprising an alkaline earth support component wherein the alkaline earth is barium.

9. The catalyst of claim 1, wherein the alkaline earth support component comprises a ceramic oxide binder in an amount greater than about 1 weight percent and less than about 7 weight percent.

10. The catalyst of claim 1, wherein the alkaline earth support component comprises a mixture of zeolite in a proportion ranging from about 55 to about 65 weight percent and alumina in a proportion ranging from about 35 to about 45 weight percent.

11. The catalyst of claim 1, wherein the alkaline earth support component comprises a mixture of an alkaline earth zeolite catalyst and an alkaline earth alumina catalyst.

12. A non-precious metal catalyst for treating an exhaust gas stream comprising an alkali metal oxide component in combination with an alkaline earth support component and including a ceramic oxide binder in an amount greater than about 1 weight percent and less than about 7 weight percent.

13. The catalyst of claim 12 for treating an exhaust gas stream comprising an alkali metal oxide component in combination with an alkaline earth support component and including a zirconium oxide binder in an amount greater than about 1 weight percent and less than about 7 weight percent.

14. A non-precious metal catalyst for treating an exhaust gas stream comprising an alkali metal oxide component in combination with an alkaline earth support component, wherein the support is selected from the group consisting of zeolite, alumina, and mixtures thereof, and wherein the support comprises a mixture of zeolite in a proportion ranging from about 55 to about 65 weight percent and alumina in a proportion ranging from about 35 to about 45 weight percent.

15. A non-precious metal catalyst for treating an exhaust gas stream comprising more than about 4 weight percent of an alkali metal oxide component comprising lithium oxide, in combination with an alkaline earth zeolite catalyst, and not more than about 7 weight percent of a ceramic oxide binder, wherein no precious metals are present in the catalyst.

16. The catalyst of claim 15 for treating an exhaust gas stream comprising more than about 8 weight percent of an alkali metal oxide component in combination with less than about 48 weight percent of an alkaline earth zeolite component and less than about 41 weight percent of an alkaline earth alumina component and not more than about 5 weight percent of a ceramic oxide binder.

17. The catalyst of claim 16 for treating an exhaust gas stream comprising about 10 weight percent of an alkali metal oxide component in combination with about 47 weight percent of an alkaline earth zeolite component and about 40 weight percent of an alkaline earth alumina component and about 3 weight percent of a ceramic binder.

18. The catalyst of claim 15, wherein the alkaline earth support component comprises a ceramic oxide binder in an amount greater than about 1 weight percent and less than about 7 weight percent.

19. A non-precious metal catalyst for treating an exhaust gas stream comprising a substrate supporting a coating having more than about 4 weight percent of a lithium oxide component in combination with a barium zeolite catalyst, and not more than about 7 weight percent of a ceramic oxide binder, wherein no precious metals are present in the catalyst.

20. The catalyst of claim 17 for treating an exhaust gas stream comprising a substrate supporting a coating having more than about 8 weight percent of a lithium oxide component in combination with less than about 48 weight percent of a barium zeolite component and less than about 41 weight percent of a barium alumina component and not more than about 5 weight percent of a ceramic oxide binder.

21. The catalyst of claim 20 for treating an exhaust gas stream comprising a substrate supporting a coating having more than about 10 weight percent of a lithium oxide component in combination with less than about 47 weight percent of an barium zeolite component and less than about 40 weight percent of a barium alumina component and not more than about 3 weight percent of a ceramic oxide binder.

* * * * *